G. S. TOWAR.
DYNAMOMETER.
APPLICATION FILED JULY 13, 1917.

1,382,694.

Patented June 28, 1921.
2 SHEETS—SHEET 2.

Inventor
GEORGE S. TOWAR.
By Ralzemond A. Parker
Attorney

UNITED STATES PATENT OFFICE.

GEORGE S. TOWAR, OF DETROIT, MICHIGAN.

DYNAMOMETER.

1,382,694.

Specification of Letters Patent.   Patented June 28, 1921.

Application filed July 13, 1917. Serial No. 180,304.

*To all whom it may concern:*

Be it known that I, GEORGE S. TOWAR, a citizen of the United States, residing at Detroit, county of Wayne, State of Michigan, have invented a certain new and useful Improvement in Dynamometers, and declare the following to be a full, clear, and exact description of the same, such as will enable others skilled in the art to which it pertains to make and use the same, reference being had to the accompanying drawings, which form a part of this specification.

This invention relates to electric dynamometers and has for its object a dynamometer constructed with a minimum amount of windings and having the capacity of dissipating the electrical energy developed in the form of heat without requiring the expensive connections and a rheostat for this purpose as is the common practice.

It also does away with a commutator which is ordinarily used with electric dynamometers and consequently does away with a source of considerable trouble.

In the drawings,—

Figure 1:
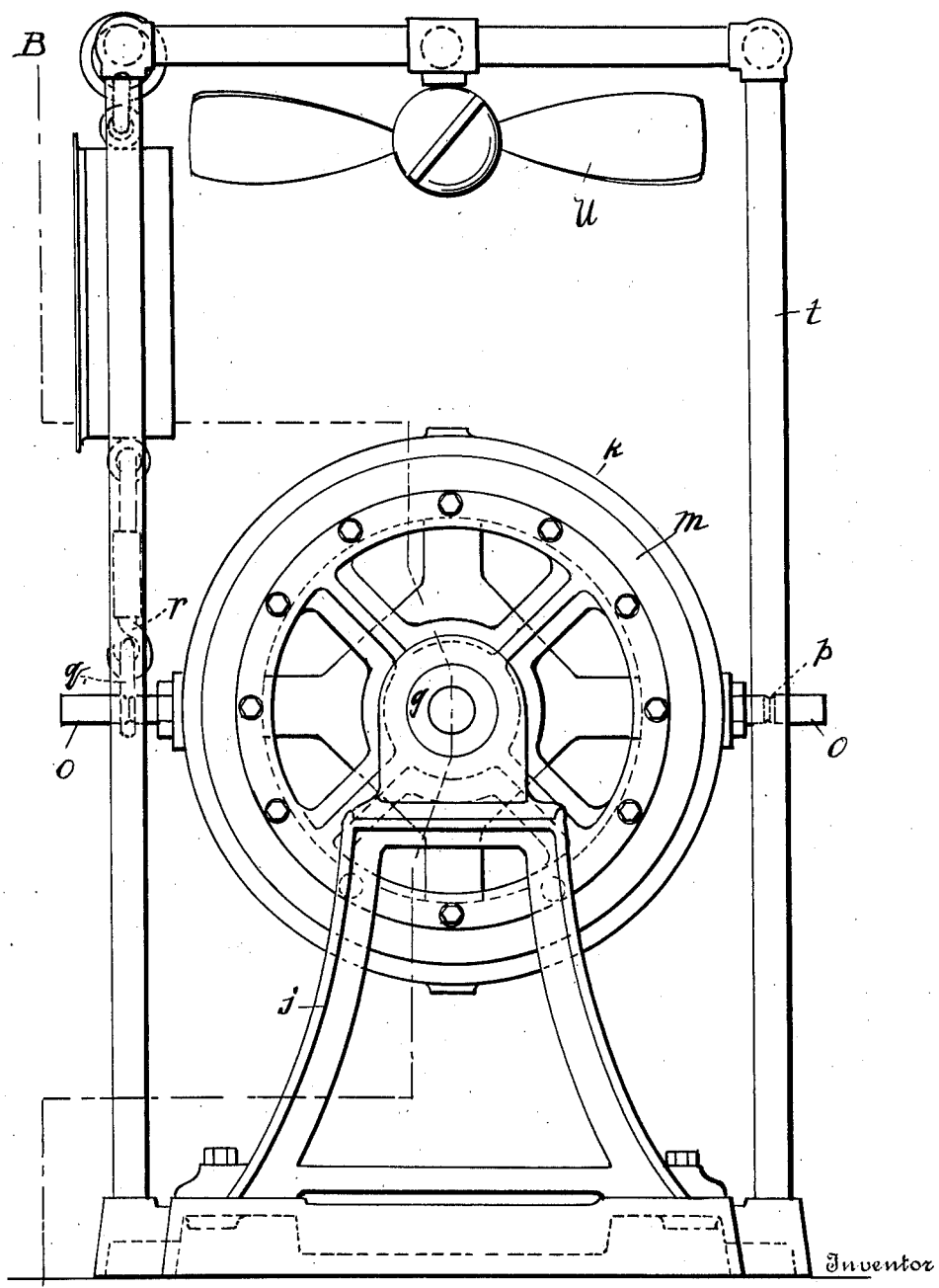
Figure 1 is an end elevation of the dynamometer.
Figure 2:
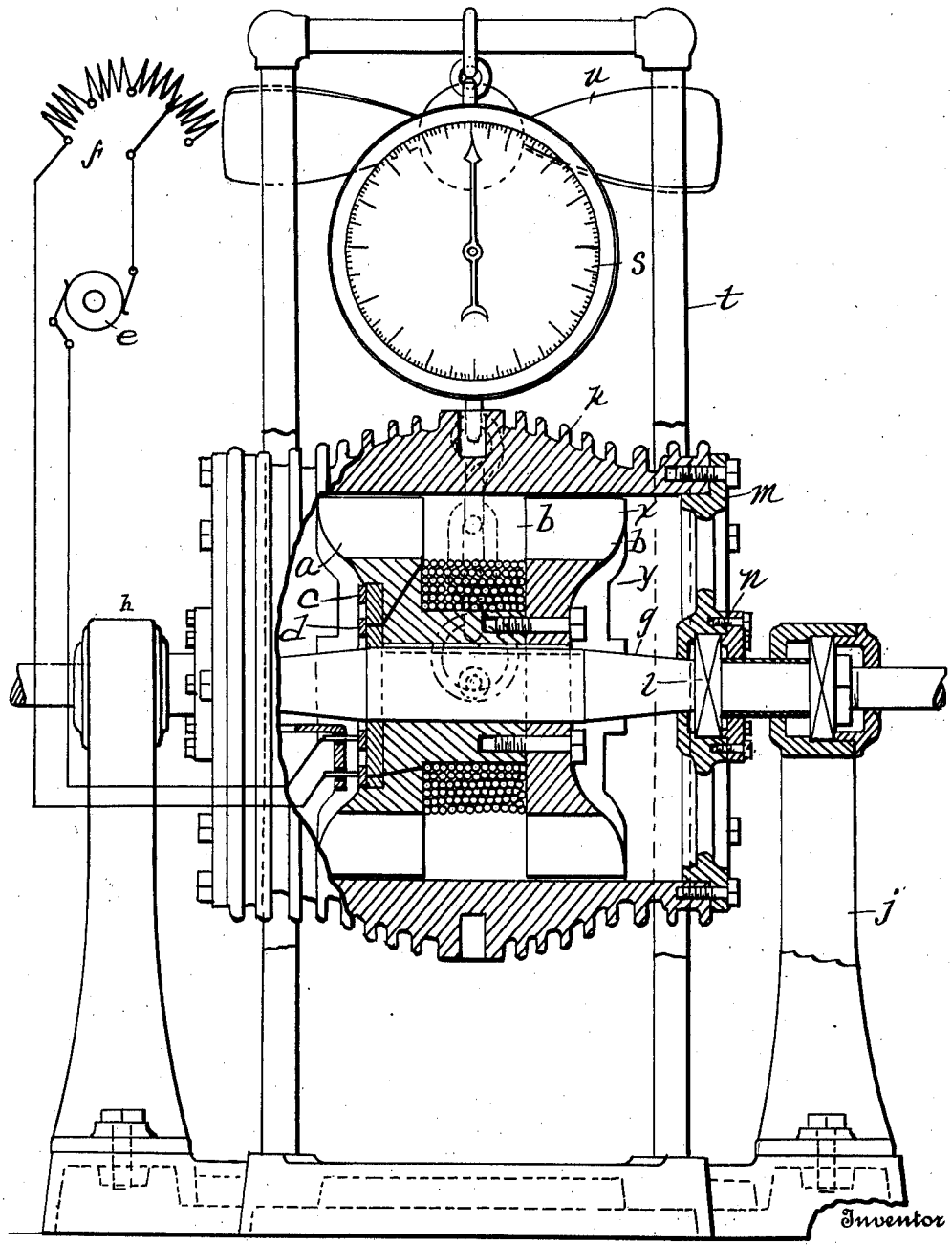
Fig. 2 is a front elevation with a portion broken away to show the internal construction.

In place of the usual stationary field and revolving armature and their windings, I substitute a revolving field made up of two annuli or core sections split up into a plurality of poles $x$ by the radial slots $y$, one section $a$ with a hub and the other $b$ with bolt holes so that the two can be bolted together to form an annular winding groove $b$ which may be wound about half its height. This forms a very simple construction for the field and a very cheap one as only one winding is necessary. Collector rings $c$ and $d$ are provided at the end and take current from brushes connected with a source of current $e$ having a rheostat $f$ in the line to regulate the amount of current and consequently the flux in the field. The field magnet is revolved by the shaft $g$ rotating in the journal $h$. This journal comprises two members fitted together to form a stuffing box containing oil. Rotatably mounted upon this drive shaft $g$ is the armature $k$ in the form of an annularly finned barrel, at each end of which is bolted the spider $m$ whose nave has an antifriction bearing $l$ mounting upon the shaft and which in conjunction with the cap $n$ forms a stuffing box about the bearing. On both sides of the barrel of the armature are projecting pins $o$, each provided with an annular groove $p$ V-shaped in cross section. This V-shaped groove receives a ring $q$ of suitable cross section on the end of the hook $r$ that connects with the spring-balanced scale $s$ supported from the frame-work $t$. This frame work $t$ also supports an electric fan $u$ which may be used if desired to facilitate the cooling of the barrel of the armature which heats up due to the generation of electric currents.

The method of operation is to connect the device whose power is to be measured with the drive shaft $g$ and revolve the field. The magnetic flux set up by the revolving field tends to drag the armature around with it, but this, of course, is resisted by being connected up with the spring scale $s$. The power is then very easily read upon the scale as the finger and the dial indicate the pull of the armature in its turning efforts.

The dynamometer can be easily fitted for use with engines or motors with a varying capacity by changing the field flux with the rheostat and consequently increasing or decreasing the torque of the magnet upon the armature.

From the above description it will be seen that a dynamometer with all the efficiency and advantages of the ordinary commercial dynamometer is afforded, yet with a very much cheaper construction and one which does away with the necessity of an armature winding, commutator and load rheostat for dissipating the electrical energy.

What I claim is:

1. The combination constituting a dynamometer of a hollow integral cylinder of magnetic metal adapted to turn about its axis and provided with means for measuring the torque exerted thereon and a field magnet concentric with said armature and adapted to rotate in the same, and means for connecting said field magnet with a source of power to rotate said field magnet, said armature being provided with cooling ribs, substantially as and for the purpose described.

2. A device of the character described comprising a base, a field rotatably supported on the base, an armature rotatable around the field, a source of electric energy connected to the field, a projection extending from the periphery of the armature, and means connected to the projection for registering power as the armature is rotated by drag from the magnetic flux set up by the rotation of the field.

3. A device of the character described comprising a base, a field rotatably supported on the base, an armature rotatable around the field, a source of electric energy connected to the field, a projection extending beyond the periphery of the armature and having a circumferential groove, and means connected to the projection and engaging in the groove for registering power as the armature is rotated by drag from the magnetic flux set up by the rotation of the field.

4. A device of the character described comprising a base, standards carried by the base, a shaft rotatably supported by the standards, a field carried by the shaft, a source of electric energy connected to the field, an armature rotatably mounted on the shaft and surrounding the field, a projection extending from the periphery of the armature, means connected to the projection for registering power as the armature is rotated by the drag from the magnetic flux set up by the rotation of the field, a frame supported on the base, and a fan supported by the flame over the armature for cooling said armature.

In testimony whereof, I sign this specification.

GEORGE S. TOWAR.